United States Patent
Parikh (10) Patent No.: US 11,307,884 B2
(45) Date of Patent: Apr. 19, 2022

(54) ADAPTIVE RESOURCE MANAGEMENT OF A CLUSTER OF HOST COMPUTERS USING PREDICTED DATA

(71) Applicant: VMware, Inc., Palo Alto, CA (US)

(72) Inventor: Aashish Parikh, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 807 days.

(21) Appl. No.: 14/333,213

(22) Filed: Jul. 16, 2014

(65) Prior Publication Data

US 2016/0021024 A1    Jan. 21, 2016

(51) Int. Cl.
*G06F 9/50* (2006.01)
*G06F 9/455* (2018.01)

(52) U.S. Cl.
CPC ........... *G06F 9/45558* (2013.01); *G06F 9/50* (2013.01); *G06F 2009/4557* (2013.01); *G06F 2009/45566* (2013.01); *G06F 2009/45595* (2013.01)

(58) Field of Classification Search
CPC .................................................. H04L 47/823
USPC ....................................................... 709/226
See application file for complete search history.

(56) References Cited

U.S. PATENT DOCUMENTS

| | | | |
|---|---|---|---|
| 5,819,030 A * | 10/1998 | Chen ...................... G06F 9/50 709/220 |
| 6,230,114 B1 | 5/2001 | Hellestrand et al. |
| 7,958,058 B2 | 6/2011 | Man et al. |
| 8,260,840 B1 | 9/2012 | Sirota et al. |
| 9,116,803 B1 | 8/2015 | Agrawal et al. |
| 2004/0103194 A1 * | 5/2004 | Islam ...................... G06F 9/505 709/225 |
| 2008/0320482 A1 | 12/2008 | Dawson et al. |
| 2009/0300173 A1 * | 12/2009 | Bakman ................ G06F 11/008 709/224 |
| 2010/0005173 A1 | 1/2010 | Baskaran et al. |
| 2010/0070784 A1 | 3/2010 | Gupta et al. |
| 2011/0307423 A1 * | 12/2011 | Shotton ................ G06K 9/6282 706/12 |
| 2012/0042312 A1 | 2/2012 | Isci et al. |
| 2012/0053925 A1 | 3/2012 | Geffin et al. |
| 2012/0131176 A1 | 5/2012 | Ferris et al. |
| 2012/0278800 A1 | 11/2012 | Nicholas et al. |
| 2013/0007753 A1 * | 1/2013 | Jain ........................ G06F 9/46 718/103 |
| 2013/0046710 A1 * | 2/2013 | Kartoun ................ G06Q 40/06 705/36 R |
| 2013/0227558 A1 | 8/2013 | Du et al. |
| 2013/0326038 A1 * | 12/2013 | Bodik .................... G06F 9/4856 709/223 |
| 2014/0019966 A1 | 1/2014 | Neuse et al. |
| 2014/0095696 A1 * | 4/2014 | Sala .................... G06F 11/3409 709/224 |

* cited by examiner

Primary Examiner — Joon H Hwang
Assistant Examiner — Sherman Lin
(74) Attorney, Agent, or Firm — Thomas | Horstemeyer LLP (57) ABSTRACT

A resource management system and method for performing resource management operations in a distributed computer system uses predicted resource demands for a specified time in the future to change a resource management option of a resource management analysis algorithm prior to the specified time so that the resource management analysis algorithm can be executed in anticipation of the predicted resource demands at the specified time.

24 Claims, 4 Drawing Sheets

ADAPTIVE RESOURCE MANAGEMENT OF A CLUSTER OF HOST COMPUTERS USING PREDICTED DATA

BACKGROUND

Sharing resources in a networked computer system, such as processors, computer memories, network bandwidth and data storage facilities, among clients, e.g., virtual machines (VMs), running on the system can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments. Thus, efficiently and effectively managing the shared resources for the clients running in the networked computer system is an important task to ensure that the clients are operating at their desired levels.

Conventional resource management solutions may involve using complex algorithms to track and model multiple metrics in order to make resource management recommendations. These conventional resource management solutions may also perform load balancing operations to balance the load in a networked computer system, which may involve migrating clients to different host devices in the system to increase or decrease the load on the host devices. However, the process of migrating clients involves significant time and resources, which may impact the performance of operations being performed by the clients in the networked computer system during heavy load conditions. Thus, when load conditions change suddenly, conventional resource management solutions may not be able to efficiently perform resource management operations.

SUMMARY

A resource management system and method for performing resource management operations in a distributed computer system uses predicted resource demands for a specified time in the future to change a resource management option of a resource management analysis algorithm prior to the specified time so that the resource management analysis algorithm can be executed in anticipation of the predicted resource demands at the specified time. Thus, resource management operations, such as load balancing, can be executed for the distributed computer system in a more efficient manner.

A method for performing resource management operations in a distributed computer system in accordance with an embodiment of the invention comprises analyzing resource demands of clients running in the distributed computer system to produce predicted resource demands for a specified time in the future, changing a resource management option of a resource management analysis algorithm from a first option setting to a second option setting at a first time prior to the specified time, and executing the resource management analysis algorithm with the second option setting in anticipation of the predicted resource demands at the specified time. In some embodiments, the steps of this method are performed when program instructions contained in a computer-readable storage medium are executed by one or more processors.

A resource management system supported by hardware in a distributed computer system in accordance with an embodiment of the invention comprises an analytics engine configured to analyze resource demands of clients running in the distributed computer system to produce predicted resource demands for a specified time in the future, an option setting unit configured to change a resource management option of a resource management analysis algorithm from a first option setting to a second option setting at a first time prior to the specified time, and a resource management module configured to execute the resource management analysis algorithm with the second option setting in anticipation of the predicted resource demands at the specified time.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
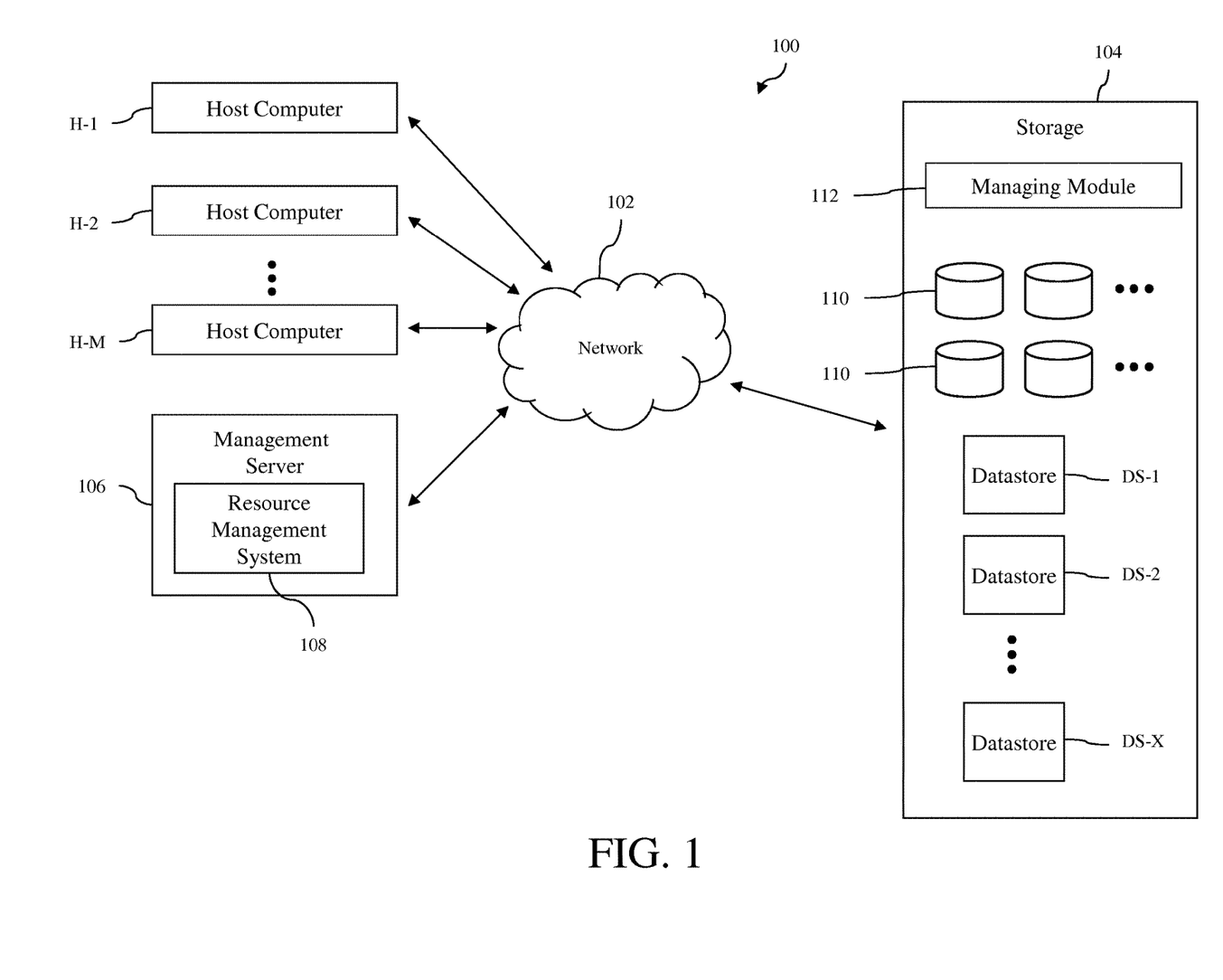
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a cluster of host computers H-1, H-2 . . . H-M (where M is a positive integer), storage 104, a management server 106 with a resource management system 108. The host computers, the storage and the management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in a single server rack. However, in other embodiments, the host computers may be installed in multiple server racks in the same or different facilities.

Figure 2:
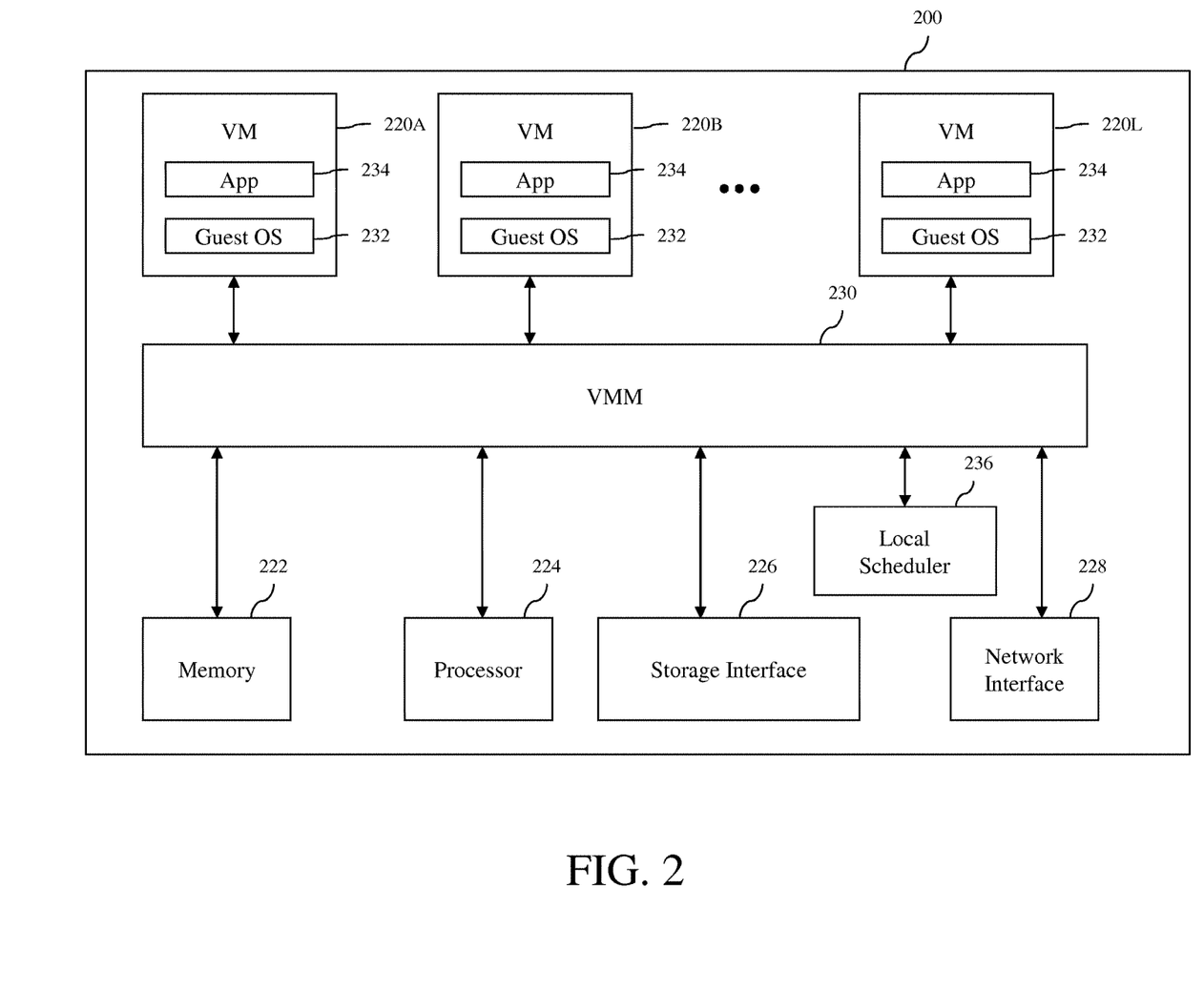
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the cluster, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the cluster. For virtual machines, the datastores may be used to store virtual storage, e.g., virtual disks, used by each of the virtual machines, as well as other files needed to support the virtual machines.

The management server 106 operates to monitor and manage the host computers H-1, H-2 . . . H-M in cluster. The management server may be configured to monitor the current configurations of the host computers and the clients running on the host computers, for example, virtual machines (VMs). The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the management server.

The management server 106 may also perform operations to manage the clients and the host computers H-1, H-2 . . . H-M in the cluster. As illustrated in FIG. 1, in an embodiment, the cluster management server includes the resource management system 108, which can be enabled by a user, to perform resource management operations for the cluster, such as, but not limited to, resource allocation, load balancing and placement of clients on different host computers in the cluster. Thus, in this embodiment, the resource management system is part of the management server. However, in other embodiments, the resource management system may be physically separate from the management server and situated external to the management server. Still, in other embodiments, the resource management system may be distributed among different components of the distributed computer system 100 so that parts of the resource management system operate in different components, such as the management server or the host computers. The resource management system may be implemented in any combination of hardware and software. In a particular implementation, the resource management system may be implemented as software programs that are executed by one or more processors of the one or more physical computers that are supporting the resource management system.

In some embodiments, the management server 106 may be a physical computer, and thus, includes memory and one or more processors, as well as other components commonly found in a computer system. In other embodiments, the management server may be implemented as one or more software programs running on one or more physical computers, such as the host computer 200 shown in FIG. 2, or virtual computers, such as the 220A, 220B . . . 220L. In an implementation, the management server is a VMware vCenter™ server with at least some of the features available for such a server, and some or all of the components of the resource management system 108 may be incorporated into VMware Distributed Resource Scheduler (DRS).

Figure 3:
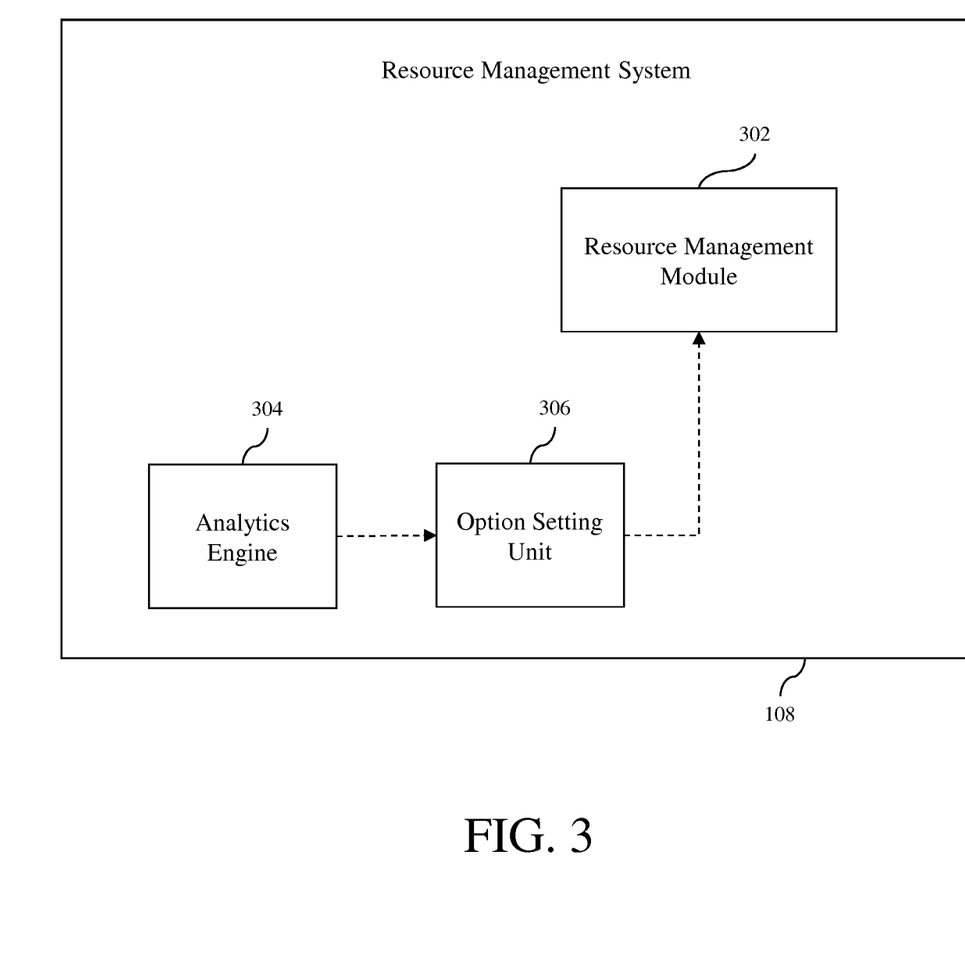
FIG. 3 is a block diagram of a resource management system included in the distributed computer system in accordance with an embodiment of the invention.

Turning now to FIG. 3, components of the resource management system 108 in accordance with an embodiment of the invention are shown. As illustrated in FIG. 3, the resource management system includes a resource management module 302, an analytics engine 304 and an option setting unit 306. The components of the resource management system may be implemented in any combination of hardware, software and firmware. In one implementation, these components of the resource management system are implemented as one or more software programs running in the management server 106 using one or more processors associated with or installed in the management server. In other implementations, these components of the resource management system are implemented as one or more software programs running on different devices in the distributed computer system 100 using one or more processors associated with or installed in the different devices.

The resource management module 302 of the resource management system 108 executes a resource management analysis algorithm, which may comprise multiple algorithms, routines and/or subroutines, to make recommendations regarding resource allocation, load balancing, initial placement of clients and any other resource management operations in the cluster. In an embodiment, the resource management module 302 includes a number of options that may be set to cause the resource management module to use different levels of aggressiveness when performing resource management operations to make the resource management recommendations, which may involve migrating some clients between the host computers H-1, H-2 . . . H-M in the cluster. These resource management options may be parameters of the resource management analysis algorithm that affect the computations and calculations performed by the algorithm, including the amount of data and/or thresholds to be used in those computations and calculations. These resource management options of the resource management module may be set manually by a user of the management server 106 or may be set automatically by one or more devices or programs that can communicate with the resource management module, in particular, the option setting unit 306. These resource management options affect various metrics that the resource management module is trying to control, such as compliance with user-specified hard and soft business rules, which may include VM to VM (VM-VM) or VM to host computer (VM-Host) affinity or anti-affinity rules, client happiness (level of satisfaction of the dynamic entitlement of all clients in the cluster), and load balance in the cluster. Depending on the settings or values of resource management options, the aggressiveness of the resource management module to achieve maximum levels for the metrics is changed. For very aggressively levels, the resource management module may perform resource management calculations that are computationally intense and/or perform resource management operations that make numerous client migrations, which may not be desired during heavy load conditions since the intense computations and/or client migrations may affect the application performance of the clients running in the cluster. These resource management options may include, but not limited to, options related to the metrics used to executed the resource management analysis algorithm, the amount of data to be processed for the resource management algorithm and the thresholds used by the resource management algorithm. The following are examples of the resource management options in an embodiment in which the clients running in the cluster are VMs.

EnableVmActiveAdjust (This option enable adjustment of VM CPU active).

GoodnessPerStar (This option requires maximum goodness in 1/1000 for a 1-star recommendation).

MinGoodness (Goodness is a measure of the improvement of imbalance that any VM migration may bring to the cluster. The MinGoodness is an option that controls the threshold that the goodness must cross before being considered by DRS).

MinImbalance (This option requires minimum cluster imbalance in 1/1000 for any recommendations).

RelocateThresh (This option defines threshold in stars for relocation).

SecondaryMetricWeight (This option defines weight for secondary metric in overall metric).

IdleTax (This option defines idle tax percentage. When set to 0, idle tax is completely disabled).

AvgStatPeriod (This option defines statistical sampling period in minutes).

MigrationInterval (This option defines minimum time between migration recommendations in seconds).

CpuActivePctThresh (This option defines active percentage threshold above which the VM's CPU entitlement cap is increased to cluster maximum Mhz. When set to 125, this feature is disabled).

Maxmovesperhost (This option defines maximum number of moves per host returned in each invocation; it is set to the greater of user set value for the option and DRS computed value with respect to average migration time, number of simultaneous moves per host, and polling interval).

ResourceChangeThresh (This option defines minimum percent of resource setting change for a recommendation).

EwmaWeight (This option defines weight for newer samples in exponential weighted moving average in 1/100's).

CostBenefit (This option enables/disables the use of cost benefit metric for filtering moves).

UseDownTime (This option enables/disables the use of downtime in cost benefit metric).

IgnoreDownTimeLessThan (This option defines a value in seconds that when downtime is less than this value, the downtime is ignored).

MaxRecursionDepth (This option enables maximum depth in the recursive algorithm for forced placement).

MinStarsForMandMoves (This option enables minimum star rating for mandatory recommendations).

RawCapDiffPercent (This option defines percent by which raw capacity values need to differ to be significant).

MaxHostMemOvercommitPct (This option defines maximum percentage of memory over-commitment allowed per host).

MaxClusterMemOvercommitPct (This option defines maximum memory over-commitment percent at cluster level).

VmDemandHistorySecsSoftRules (This option defines period in seconds that recent demand history is considered over this period in making decisions to drop soft rules).

SecondaryMetricWeightMult (This option defines weight multiplier for secondary metric in overall metric).

SevereImbalanceRelaxMinGoodness (This option enables retry of correcting severe load imbalance with minGoodness set to 0).

SevereImbalanceRelaxCostBenefit (This option enables retry of correcting severe load imbalance with relaxed costBenefit and downTime filters).

SevereImbalanceDropCostBenefit (This option enables retry of correcting severe load imbalance with costBenefit set to 0).

FixSevereImbalanceOnly (This option enable conservative load balancing while handling severe load imbalance and only perform load balancing moves till the cluster is out of severe imbalance).

MaxLBPasses (This option defines maximum number of passes before breaking out of the main loop of the resource management load balancing algorithm).

PercentIdleMBInMemDemand (This option defines percentage of idle Mega Bytes (MB) to be included as part of memory demand resource management option: percentage is of idle (consumed but not active) memory).

MaxDrsCalcThreads (This option defines maximum number of threads resource management algorithm should use).

DrsCalcPerThread (This option defines number of moves to be evaluated per thread).

AllowUnlimitedCpuLimitForVMs (If this option is enabled, e.g., set to 1, clients are not capped during limit divvying for CPU).

As described in more detail below, the resource management options of the resource management algorithms executed by the resource management module 302 are adjusted or set in a predictive and adaptive manner so that the resource management module can make resource management recommendations more effectively. Once the resource management recommendations are made, for example, migrating clients to different host computers for load balancing, these recommendations may be automatically implemented by other components in the management server 106 or by other components in the distributed computer system 100. Alternatively, the recommendations may be presented to an administrator who may manually implement some or all of the recommendations.

The analytics engine 304 of the resource management system 108 operates to monitor resource demands of the clients running in the cluster and generate predicted resource demand data of the clients for a predefined period of time, e.g., a 24-hour cycle. The analytics engine receives various metrics regarding the clients running on the host computers H-1, H-2 . . . H-M in the cluster, which are processed by the analytics engine to predict future metrics. As an example, the analytics engine may receive processor (e.g., CPU) and/or memory demands for the clients running on each of the host computers in the cluster. These metrics may be provided to the analytics engine by the host computers, e.g., the VMMs of the host computers. These predicted resource demands may be generated by the analytics engine in the form of predicted resource demand values, where each predicted resource demand value may be tagged with the particular resource being predicted and a specified moment of time in the future (e.g., the hour in a 24-hour cycle).

The analytics engine 304 may generate, for each resource being considered, e.g., memory and processor resources, predicted resource demand values for each of the host computers H-1, H-2 . . . H-M in the cluster for certain times during the predefined period of time, such as every minute or every five minute of the 24-hour cycle. Thus, for each resource being considered and for each host computer, the analytics engine may generate two hundred eighty eight (288) predicted resource demand values for a 24-hour cycle if a predicted resource demand value is generated for every five minutes. In an embodiment, this predicted resource demand value may be the total predicted resource demand value for all the clients running on a host computer in the cluster, i.e., the sum of predicted resource demand values for all the different clients running on the host computer. In another embodiment, the predicted resource demand value may be an average predicted resource demand value for all the clients running on a host computer in the cluster. In other embodiments, this predicted resource demand value can be any predicted value related to the overall resource demand of the clients running on a host computer.

The analytics engine 304 may periodically update the predicted resource demand data so that the most current predicted resource demand data is available for use. The analytics engine may continuously update the predicted resource demand data by taking into consideration all the accumulated resource demand information and new resource demand information. Alternatively, the analytics engine may periodically update the predicted resource demand data using observed resource demand data for a sliding period of time in the immediate past, e.g., past six months or past six weeks.

By monitoring and analyzing historical resource demands of the clients in the cluster, the analytics engine 304 can predict resource demands based on time, such as the month, the week, the day of the week and/or the time of the day. For example, if the clients running on the cluster remain almost idle between 7 pm and 9 am everyday (i.e., a 24-hour cycle), the analytics engine could observe such a pattern and predict near-zero values for processor and/or memory demand metrics for the clients during this time period (i.e., 7 pm to 9 am) for future daily cycles.

Although the analytics engine 304 is illustrated in FIG. 3 as being part of the resource management system 108 in the management server 106, in other embodiments, the analytics engine may be another component of the management server or even another component external to the management server. In an embodiment, the analytics engine is a VMware Operations Manager running in a VMware vCenter server in the distributed computer system 100.

The option setting unit 306 of resource management system 108 operates to automatically adjust or set one or more resource management options of the resource management module 302. The option setting unit uses the predicted resource demand data produced by the analytics engine 304 to determine whether there is a need to change one or more options of the resource management module. The option setting unit may use one or more thresholds for the predicted resource demand data to determine whether there is a need to change one or more options of the resource management module. The thresholds may be used to determine different levels of aggressiveness for the resource management module. As an example, in anticipation of an increase in resource demand, the option setting unit may change one or more resource management options related to load balancing aggressiveness so that the aggressiveness of the load balancing performed by the resource management module is decreased. Conversely, in anticipation of an increase in resource demand, the option setting unit may change one or more resource management options related to load balancing aggressiveness so that the aggressiveness of the load balancing performed by the resource management module is increased. In an embodiment, the option setting unit may override any option setting change due to predicted resource demands when the actual resource demands warrant a different option setting change.

The option setting unit 306 may change one or more resource management options of the resource management module 302 for a particular period of time at any time in anticipation of the predicted or expected resource demands for that period of time. In an embodiment, the option setting unit may gradually change one or more resource management options prior to a particular period of time so that the aggressiveness of the resource management module is gradually adjusted to accommodate the expected resource demands during that period of time. If high resource demands are expected for a particular period of time in the near future, then the option setting unit may gradually change one or more resource management options to more conservative settings before that period of time so that the aggressiveness of the resource management module is gradually reduced to accommodate the expected high resource demands during that period of time. Similarly, if low resource demands are expected for a particular period of time in the near future, then the option setting unit may gradually change one or more resource management options to more aggressive settings before that period of time so that the aggressiveness of the resource management module is gradually increased to accommodate the expected low resource demands during that period of time. The gradual change of one or more resource management options of the resource management module by the option setting unit may begin at any predetermined time prior to a particular period of time, such as few hours or minutes before the beginning of that particular period of time. After the initial option setting change, the option setting unit may execute subsequent option setting changes at any time interval. The subsequent option setting changes may occur at fixed intervals, such as every 30 minutes, and/or at varying intervals, such as intervals that can be anywhere between 1 minute to 60 minutes. In an embodiment, the amount of option setting changes may be increased as the particular period of time for the expected load change nears. For example, if high load is expected at 9 am, a change in a particular option setting at 6 am may be from a setting of "20" to "18", a change in the particular option setting at 7 am may be from a setting of "18" to "14", and a change in the particular option setting at 8 am may be from a setting of "14" to "6".

The setting of a resource management option may involve transmitting a control message with an identifier for the option and the corresponding option setting value to the resource management module 302 from the option setting unit 306 using any suitable protocol. Alternatively, the setting of a resource management option may involve changing a stored value corresponding to the option in one or more computer files stored in a storage device accessible by the resource management module. After one or more resource management options have been changed, the resource management module executes the resource management analysis algorithm using all the options, including any options that have been changed by the option setting unit, and the aggressiveness of the resource management analysis algorithms will depend on the current options that are used by the resource management module. In some embodiments, the option setting unit may set all the resource management options of the resource management module, including any option that has been changed. In other embodiments, the option setting unit may only set the resource management options that are to be changed.

The operation of the resource management system 108 in accordance with an embodiment of the invention will now be described using two examples in which the clients running in the cluster remain almost idle every day (in a 24-hour cycle) during the hours of 7 PM to 9 AM, but the clients are heavily consuming resources during the hours of 9 AM to 7 PM. In these examples, what this means is that the load on the clients during the hours of 7 PM to 9 AM is very low, but the load on the clients during the hours of 9 AM to 7 PM is very high.

The analytics engine 304 of the resource management system 108 monitors resource demands of the clients in the cluster and generates predicted resource demand data of the clients for a 24-hour cycle. This monitoring process may be for any defined period of time, such as several days, weeks or months. In these examples in which the load on the clients in the cluster is high during the hours of 9 AM to 7 PM and low between the hours of 7 PM and 9 AM in a 24-hour cycle, the analytics engine will generate low predicted resource demand values for the period of 7 PM to 9 AM (e.g., near-zero values) and high predicted resource demand values for the period of 9 AM to 7 PM.

Using the predicted resource demand values generated by the analytics engine 304, the option setting unit 306 will modify one or more resource management option settings for the resource management module 302 at certain times during a 24-hour cycle in anticipation of the expected load on the clients in the cluster, which will then be used by the resource management module to execute the resource management analysis.

In a first example, the option setting unit 306 modifies some of the resource management options to change the level of aggressiveness of the resource management module 302 to explore load balancing decision tree using the predicted load data. In this example, the resource management module 302 is assumed to execute resource management algorithms of VMware DRS to perform resource management operations for virtual machines (VMs). However, embodiments in accordance with the invention are not limited to such resource management algorithms and/or VMs. In this first example, the option setting unit modifies the following three resource management options: (1) MaxRecursionDepth, which defines the maximum depth in the recursive algorithm for forced placement; (2) MaxDrsCalcThreads, which defines the maximum number of threads the resource management module should use; and (3) DrsCalcPerThread, which defines the number of moves to be evaluated per thread. These options govern the degree of parallelism and aggressiveness with which the resource management module comb through the solution space realized by a decision tree for placement and/or load balancing, looking to transition the cluster to better states. Consequently, the values of these options can make the resource management analysis algorithms less effective (small values for the three options) or take a longer time to complete (large values for the three options). Thus, these resource management options affect the amount of computation that is performed by the resource management analysis algorithm to find a solution for client placement or load balancing. Below is a table that illustrates the option setting changes initiated by the option setting unit during a 24-hour cycle for the first example.

| Time | Resource Management Options |
| --- | --- |
| 7:00 PM | conservative values (e.g., default) |
| ... | |
| 12:00 AM | highest aggressive values |
| ... | |
| 4:00 AM | medium aggressive values |
| ... | |
| 5:00 AM | low aggressive values |
| ... | |
| 6:00 AM | conservative values (e.g., default) |
| ... | |
| 9:00 AM | conservative values (e.g., default) |
| ... | |
| 7:00 PM | conservative values (e.g., default) |

As shown in the above table, at 7:00 PM, the load is still expected to be high, and thus, the MaxRecursionDepth option is set to a conservative setting of "1" by the option setting unit 306, which is the default setting/value. In addition, the other two resource management options, i.e., the MaxDrsCalcThreads and DrsCalcPerThread options, may also be set to conservative settings/values, e.g., default settings/values.

At 12:00 AM, the load has become very low as predicted, and thus, the MaxRecursionDepth option is set to the highest aggressive setting of "5" by the option setting unit 306. In addition, the other two resource management options may also be set to their highest aggressive settings/values. This would lead to very high-quality moves that would have been missed when these three options are set to their conservative settings/values, e.g., default values. However, the computations involved in the resource management analysis using these settings/values would be intensive and prohibitively expensive during times of high load.

At 4:00 AM, the load still remains very low as predicted, but the load is expected to increase at 9:00 AM. Thus, the three options can be gradually increased starting at 4:00 AM. In this example, at 4:00 AM, the MaxRecursionDepth option is lowered to the medium aggressive setting of "3" by the option setting unit 306. In addition, the other two resource management options may also be lowered to their medium aggressive settings/values.

At 5:00 AM, in anticipation of the load increase at 9:00 AM, the MaxRecursionDepth option is lowered to the low aggressive setting of "2" by the option setting unit 306. In addition, the other two resource management options may also be lowered to their low aggressive settings/values.

At 6:00 AM, in anticipation of the load increase at 9:00 AM, the MaxRecursionDepth option is lowered back to the conservative setting of "1" by the option setting unit 306. In addition, the other two resource management options may also be lowered to their conservative settings/values. Thus, when the workload changes, as predicted, at 9:00 AM, these option settings/values are back at conservative values and computations performed by the resource management module 302 do not cause any unnecessary trouble to the management server 106. These option settings/values will remain the same until 12:00 AM when the load is expected to become very low.

As illustrated in the above example, the option setting unit 306 of the resource management system 108 can change the resource management options to their highest aggressive settings/values during low demand times, e.g., 12:00 AM to 4:00 AM so that the resource management module 302 can make very intensive computations to make high-quality client moves for load balancing. However, before load increases as expected by the predicted data, the option setting unit can change the resource management options back to their conservative settings/values so that computations performed by the resource management module is not unduly expensive with respect to resource consumption.

In a second example, the option setting unit 306 modifies some of the resource management options to change the ability of the resource management module 302 to aggressively load-balance the cluster. In this example, the resource management module is assumed to execute resource management algorithms of VMware DRS to perform resource management operations for VMs. However, embodiments in accordance with the invention are not limited to such resource management algorithms and/or VMs. In this second example, the option setting unit modifies the following three resource management options: (1) MaxMovesperhost, which defines maximum number of moves per host returned in each invocation; (2) PercentIdleMBInMemDemand, which defines the percentage of "idle memory" (consumed but not active) to be included as part of memory demand; and (3) EnableVmActiveAdjust, which defines whether adjustment of VM CPU active is enabled. These options govern the estimation of active CPU and memory used by the resource management module and the ability of the resource management module to aggressively load-balance the cluster. These options are among the most important parameters considered by the resource management analysis algorithm for VM placement and load balancing. Below is a table that illustrates the option setting changes initiated by the option setting unit during a 24-hour cycle for the second example.

| Time | Resource Management Options |
|---|---|
| 7:00 PM | conservative values (e.g., default) |
| ... | |
| 8:00 PM | highest aggressive values |
| ... | |
| 6:00 AM | medium aggressive values |
| ... | |
| 7:00 AM | low aggressive values |
| ... | |
| 8:00 AM | conservative values (e.g., default) |
| ... | |
| 9:00 AM | conservative values (e.g., default) |
| ... | |
| 7:00 PM | conservative values (e.g., default) |

As shown in the above table, at 7:00 PM, the load is still expected to be high, and thus, the MaxMovesperhost option is set to a conservative setting of "2" by the option setting unit 306, which is the default setting/value. In addition, the other two resource management options, i.e., the PercentIdleMBInMemDemand and EnableVmActiveAdjust options, may also be set to conservative settings/values, e.g., default settings/values. In particular, the EnableVmActiveAdjust option may be disabled and the PercentIdleMBInMemDemand option may be set to 20%.

At 8:00 PM, the load has become very low as predicted, and thus, the MaxMovesperhost option is set to the highest aggressive setting of "10" by the option setting unit 306. In addition, other two resource management options may also be set to their highest aggressive settings/values. Specifically, the EnableVmActiveAdjust option may be enabled and the PercentIdleMBInMemDemand option may be set to 0%. These option settings provide almost perfect conditions for aggressive load balancing for the resource management module 302. However, the computations involved in the resource management analysis using these settings/values would be intensive and may be prohibitively expensive during times of high load.

At 6:00 AM, the load still remains very low as predicted, but the load is expected to increase at 9:00 AM. Thus, the three options can be gradually adjusted back to their conservative settings. In this example, at 6:00 AM, the three options are set to their medium aggressive settings. Specifically, the MaxMovesperhost option is set to the medium aggressive setting of "8" by the option setting unit 306. In addition, the EnableVmActiveAdjust option may be set to "enable" and the PercentIdleMBInMemDemand option may be set to 5%.

At 7:00 AM, in anticipation of the load increase at 9:00 AM, the MaxMovesperhost option is set to the low aggressive setting of "6" by the option setting unit 306. In addition, the EnableVmActiveAdjust option may be set to "enable" and the PercentIdleMBInMemDemand option may be set to 10%.

At 8:00 AM, in anticipation of the load increase at 9:00 AM, the MaxMovesperhost option is set back to the conservative setting of "2" by the option setting unit 306. In addition, the EnableVmActiveAdjust option may be set to "disable" and the PercentIdleMBInMemDemand option may be set back to 20%.

As illustrated in the above example, the option setting unit 306 of the resource management system 108 can change the resource management options to their highest aggressive settings/values during low demand times, e.g., 8:00 PM to 6:00 AM so that the resource management module 302 can make very aggressive load balancing analysis, which involves intensive computations/operations. However, before load increases as expected by the predicted data, the option setting unit can change the resource management options back to their conservative settings/values so that computations performed by the resource management module is not unduly disruptive with respect to resource consumption.

Figure 4:
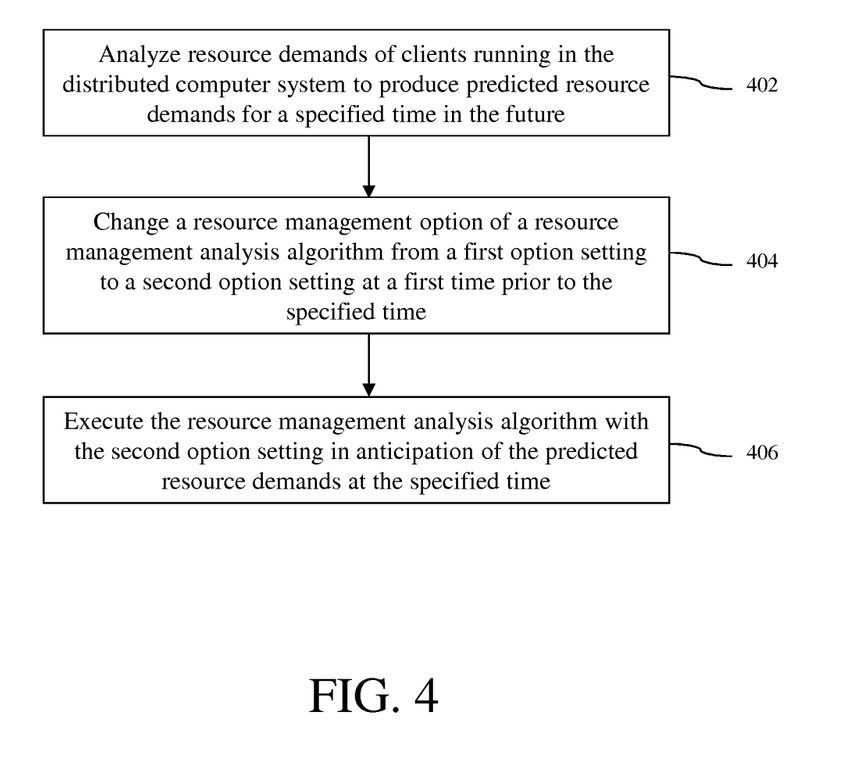
FIG. 4 is a flow diagram of a method for performing resource management operations in a distributed computer system in accordance with an embodiment of the invention.

A method for performing resource management operations in a distributed computer system in accordance with an embodiment of the invention is described with reference to a flow diagram of FIG. 4. At block 402, resource demands of clients, e.g., virtual machines, running in the distributed computer system are analyzed to produce predicted resource demands for a specified time in the future. At block 404, a resource management option of a resource management analysis algorithm is changed from a first option setting to a second option setting at a first time prior to the specified time. At block 406, the resource management analysis algorithm with the second option setting is executed in anticipation of the predicted resource demands at the specified time.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing resource management operations in a distributed computer system, the method comprising:
   receiving resource demand metrics of clients running in the distributed computer system;
   analyzing the resource demand metrics of the clients to produce predicted resource demands for a specified future time period;
   automatically changing a resource management option of a resource management analysis algorithm from a first option setting to a second option setting at a first time prior to the specified future time period based on the predicted resource demands of the clients for the specified future time period, the resource management analysis algorithm including at least a load balancing operation that is performed in the distributed computer system when executed, the first and second option settings being different settings for a parameter of the resource management analysis algorithm that changes a maximum amount of execution threads that can be used for at least the load balancing operation of the resource management analysis algorithm for the first time, wherein the second option setting comprises an aggressiveness load balancing setting that is based on a proximity of the first time to the specified future time period; and
   executing the resource management analysis algorithm with the second option setting in anticipation of the predicted resource demands at the specified future time period.

2. The method of claim 1, wherein the clients running in the distributed computer system are virtual machines and the resource demand metrics are demand metrics of virtualized resources.

3. The method of claim 1, wherein the analyzing the resource demand metrics of the clients includes analyzing at least one of processor and memory demands of the clients running in the distributed computer system.

4. The method of claim 1, wherein the resource management option is a maximum number of moves to be evaluated per thread by the resource management analysis algorithm and wherein the second option setting is a higher value than the first option setting.

5. The method of claim 1, wherein the resource management option is the maximum number of moves per host returned in each invocation to be used by the resource management analysis algorithm and wherein the second option setting is a higher value than the first option setting.

6. The method of claim 1, further comprising:
   changing the resource management option of the resource management analysis algorithm from the second option setting to a third option setting at a second time subsequent to the first time and prior to the specified future time period; and
   executing the resource management analysis algorithm with the third option setting.

7. The method of claim 6, wherein the second option setting of the resource management option is less aggressive with respect to load balancing than the first option setting and wherein the third option setting is less aggressive with respect to load balancing than the second option.

8. The method of claim 1, wherein the resource management option of the resource management analysis algorithm is related to an amount of computation that is performed by the resource management analysis algorithm to find a solution for load balancing.

9. The method of claim 1, wherein the resource management option of the resource management analysis algorithm is related to an ability of the resource management analysis algorithm to aggressively perform a load-balance analysis.

10. A non-transitory computer-readable storage medium containing program instructions for performing resource management operations in a distributed computer system, wherein execution of the program instructions by one or more processors of a computer system causes the one or more processors to perform steps comprising:
   receiving resource demand metrics of clients running in the distributed computer system;
   analyzing the resource demand metrics of the clients to produce predicted resource demands for a specified future time period;
   automatically changing a resource management option of a resource management analysis algorithm from a first option setting to a second option setting at a first time prior to the specified future time period based on the predicted resource demands of the clients for the specified future time period, the resource management analysis algorithm including at least a load balancing operation that is performed in the distributed computer system when executed, the first and second option settings being different settings for a parameter of the resource management analysis algorithm that changes a maximum amount of execution threads that can be used for at least the load balancing operation of the resource management analysis algorithm for the first time, wherein the second option setting comprises an aggressiveness load balancing setting that is based on a proximity of the first time to the specified future time period; and executing the resource management analysis algorithm with the second option setting in anticipation of the predicted resource demands at the specified future time period.

11. The non-transitory computer-readable storage medium of claim 10, wherein the clients running in the distributed computer system are virtual machines and the resource demand metrics are demand metrics of virtualized resources.

12. The non-transitory computer-readable storage medium of claim 10, wherein the analyzing the resource demand metrics of the clients includes analyzing at least one of processor and memory demands of the clients running in the distributed computer system.

13. The non-transitory computer-readable storage medium of claim 10, wherein the resource management option is the maximum number of moves to be evaluated per thread by the resource management analysis algorithm and wherein the second option setting is a higher value than the first option setting.

14. The non-transitory computer-readable storage medium of claim 10, wherein the resource management option is the maximum number of moves per host returned in each invocation to be used by the resource management analysis algorithm and wherein the second option setting is a higher value than the first option setting.

15. The non-transitory computer-readable storage medium of claim 10, further comprising:

changing the resource management option of the resource management analysis algorithm from the second option setting to a third option setting at a second time subsequent to the first time and prior to the specified future time period; and executing the resource management analysis algorithm with the third option setting.

16. The non-transitory computer-readable storage medium of claim 15, wherein the second option setting of the resource management option is less aggressive with respect to load balancing than the first option setting and wherein the third option setting is less aggressive with respect to load balancing than the second option.

17. The non-transitory computer-readable storage medium of claim 10, wherein the resource management option of the resource management analysis algorithm is related to an amount of computation that is performed by the resource management analysis algorithm to find a solution for load balancing.

18. A resource management system supported by hardware in a distributed computer system comprising:

an analytics engine configured to receive resource demand metrics of clients running in the distributed computer system and analyze the resource demand metrics to produce predicted resource demands for a specified future time period;

an option setting unit configured to automatically change a resource management option of a resource management analysis algorithm from a first option setting to a second option setting at a first time prior to the specified future time period based on the predicted resource demands of the clients for the specified future time period, the resource management analysis algorithm including at least a load balancing operation that is performed in the distributed computer system when executed, the first and second option settings being different settings for a parameter of the resource management analysis algorithm that changes a maximum amount of execution threads that can be used for at least the load balancing operation of the resource management analysis algorithm, wherein the second option setting comprises an aggressiveness load balancing setting that is based on a proximity of the first time to the specified future time period; and a resource management module configured to execute the resource management analysis algorithm with the second option setting in anticipation of the predicted resource demands at the specified future time period.

19. The resource management system of claim 18, wherein the clients running in the distributed computer system are virtual machines and the resource demand metrics are demand metrics of virtualized resources.

20. The resource management system of claim 18, wherein the analytics engine is configured to analyze at least one of processor and memory demands of the clients running in the distributed computer system.

21. The resource management system of claim 18, wherein the resource management option is the maximum number of moves to be evaluated per thread by the resource management analysis algorithm and wherein the second option setting is a higher value than the first option setting.

22. The resource management system of claim 18, wherein the resource management option is the maximum number of moves per host returned in each invocation to be used by the resource management analysis algorithm and wherein the second option setting is a higher value than the first option setting.

23. The resource management system of claim 18, wherein the option setting unit is further configured to change the resource management option of the resource management analysis algorithm from the second option setting to a third option setting at a second time subsequent to the first time and prior to the specified future time period and wherein the resource management module is configured to execute the resource management analysis algorithm with the third option setting.

24. The resource management system of claim 18, wherein the first and second option settings being different settings for the parameter of the resource management analysis algorithm further comprises changing an amount of client migrations that are permissible for the first time.

* * * * *